(12) United States Patent
Frantz et al.

(10) Patent No.: US 7,385,374 B2
(45) Date of Patent: Jun. 10, 2008

(54) ADAPTIVE POWER SYSTEM

(75) Inventors: Jeremy P. Frantz, Houston, TX (US); Erik J. Welsh, Houston, TX (US); Carroll J. Ganier, II, Jefferson, LA (US)

(73) Assignee: William Marsh Rice University, Houston, TX (US)

( * ) Notice: Subject to any disclaimer, the term of this patent is extended or adjusted under 35 U.S.C. 154(b) by 295 days.

(21) Appl. No.: 10/853,862

(22) Filed: May 25, 2004

(65) Prior Publication Data

US 2004/0257047 A1 Dec. 23, 2004

Related U.S. Application Data

(60) Provisional application No. 60/473,554, filed on May 27, 2003.

(51) Int. Cl.
*H02J 7/00* (2006.01)

(52) U.S. Cl. .............. 320/138; 320/103; 320/101; 320/102; 307/66; 307/43

(58) Field of Classification Search ........ 320/101, 320/102, 103, 138; 307/66, 43
See application file for complete search history.

(56) References Cited

U.S. PATENT DOCUMENTS

| | | | | |
|---|---|---|---|---|
| 4,323,788 A | * | 4/1982 | Smith | 307/66 |
| 4,916,329 A | * | 4/1990 | Dang et al. | 307/66 |
| RE35,043 E | * | 9/1995 | Takeda | 368/205 |
| 5,684,686 A | | 11/1997 | Reddy | 363/97 |
| 5,698,967 A | | 12/1997 | Baer et al. | 320/152 |
| 5,701,068 A | | 12/1997 | Baer et al. | 320/119 |
| 5,739,596 A | * | 4/1998 | Takizawa et al. | 307/66 |
| 5,874,825 A | | 2/1999 | Brotto | 320/150 |
| 5,929,607 A | | 7/1999 | Rosenberg et al. | 320/166 |
| 5,963,010 A | * | 10/1999 | Hayashi et al. | 320/106 |
| 6,020,721 A | | 2/2000 | Brotto | 320/150 |
| 6,037,756 A | * | 3/2000 | Pong | 323/222 |
| 6,043,628 A | | 3/2000 | Perelle et al. | 320/119 |
| 6,058,320 A | * | 5/2000 | Yokota | 455/574 |
| 6,091,246 A | * | 7/2000 | Saigo et al. | 324/434 |
| 6,172,478 B1 | * | 1/2001 | Leppo et al. | 320/116 |
| 6,278,202 B1 | * | 8/2001 | Sakagawa et al. | 307/72 |
| 6,304,059 B1 | | 10/2001 | Chalasani et al. | 320/118 |
| 6,304,061 B1 | | 10/2001 | Toya | 320/134 |
| 6,326,767 B1 | | 12/2001 | Small et al. | 320/116 |
| 6,329,792 B1 | | 12/2001 | Dunn et al. | 320/132 |
| 6,459,175 B1 | | 10/2002 | Potega | 307/149 |
| 6,489,751 B2 | | 12/2002 | Small et al. | 320/150 |

(Continued)

*Primary Examiner*—Adolf Berhane
*Assistant Examiner*—Samuel Berhanu
(74) *Attorney, Agent, or Firm*—Conley Rose, P.C.; Rodney B. Carroll

(57) ABSTRACT

A power system having an extended life and a system and method for extending the life of a battery powered device. In one embodiment, the method comprises providing a plurality of power sources and an alternate energy source. The method also comprises measuring the voltage of the power sources and the alternate energy source. The method further comprises selecting a power source to provide voltage to the device, wherein the selected power source provides voltage to the device. In addition, the method comprises optionally charging any power source that is providing voltage to the device. Moreover, the method is repeated after a variable delay. Further embodiments include switching to providing the voltage to the device from a power source while charging another power source.

39 Claims, 3 Drawing Sheets

U.S. PATENT DOCUMENTS

| | | | |
|---|---|---|---|
| 6,541,940 B1 * | 4/2003 | Jungreis | 320/103 |
| 2001/0005124 A1 * | 6/2001 | Odeohhara et al. | 320/116 |
| 2001/0015635 A1 * | 8/2001 | Leppo et al. | 320/116 |

* cited by examiner

ADAPTIVE POWER SYSTEM

CROSS-REFERENCE TO RELATED APPLICATIONS

This non-provisional application claims the benefit of U.S. Provisional Application No. 60/473,554, filed May 27, 2003, which is hereby incorporated by reference in its entirety.

STATEMENT REGARDING FEDERALLY SPONSORED RESEARCH OR DEVELOPMENT

Not applicable.

BACKGROUND OF THE INVENTION

1. Field of the Invention

This invention relates to the field of power systems and more specifically to the field of extending the life of battery powered systems.

2. Background of the Invention

There has been an increasing need to extend the uptime for battery powered devices while also extending the life of the devices. Traditional battery powered devices are only operable for a finite time as traditional batteries have a limited useful life. In addition, the devices are typically inoperable or unusable when their batteries are being charged. When the batteries are sufficiently charged, the device again becomes available. Besides the device downtime involved, further drawbacks include battery memory and reduction in battery life.

For instance, in the field of sensor networks, access to a power grid is typically unavailable. Therefore, the devices are typically independent. A typical drawback is trading off device/network lifetime versus the ability for the devices to transfer data between nodes. Traditional charging schemes either allow the device to run and communicate or allow the device to charge the battery.

Battery powered devices recharged by alternate energy sources have been developed to extend battery life. However, such alternate energy sources typically do not provide enough energy to support full device operation while storing energy for later use. Additional drawbacks include the effects of battery memory because of prematurely discharging the battery before it finishes charging.

Because battery life and uptime can be quality measures of battery powered devices, there is a need for maximizing the lifetime and uptime of an individual independently powered device. Additional needs include increasing the lifetime and uptime of individual powered devices that consume large amounts of power. Further needs include operating an independently powered device while at the same time charging its batteries. In addition, needs include maximizing use of alternate energy sources.

BRIEF SUMMARY OF SOME OF THE PREFERRED EMBODIMENTS

These and other needs in the art are addressed in one embodiment by a system for extending a device life. The system includes a plurality of power sources, wherein each power source is disposed to be charged when one of the power sources is providing voltage to the device. The system further includes an alternate energy source, wherein the alternate energy source is disposed to charge power sources that are not providing voltage to the device. Moreover, the system includes a processing device.

An additional embodiment of the present invention includes a method for extending a device life. The method comprises providing a plurality of power sources and an alternate energy source. In addition, the method comprises measuring the voltage of the power sources and the alternate energy source. Moreover, the method comprises selecting a power source to provide voltage to the device, wherein the selected power source provides voltage to the device. The method further comprises optionally charging any power source that is not providing voltage to the device. The method is repeated after a variable delay.

In addition, the present invention includes an embodiment comprising a method for extending a device life wherein the method includes providing a plurality of power sources and an alternate energy source, wherein the plurality of power sources are capable of being charged. The method also comprises measuring the voltage of the plurality of power sources and the alternate energy source. The method further comprises comparing the voltage of a first power source to a first power source minimum threshold voltage, wherein the plurality of power sources includes the first power source. The method also comprises optionally comparing the voltage of at least one other power source to at least one power source minimum threshold voltage and optionally selecting a low power mode for the device. In addition, the method comprises optionally comparing the voltages of the alternate energy source to an alternate energy minimum threshold voltage.

It will therefore be seen that a technical advantage of the present invention includes an independently powered device (such as a battery powered device) that has an increased lifetime and uptime, thereby eliminating problems encountered by using conventional battery powered devices. For instance, problems encountered with downtime of the device when charging the battery are overcome as one battery can provide voltage while the other batteries are being charged. In addition, problems with reduction in battery life and battery memory are also overcome as the present invention allows one battery to be fully discharged before it is charged.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
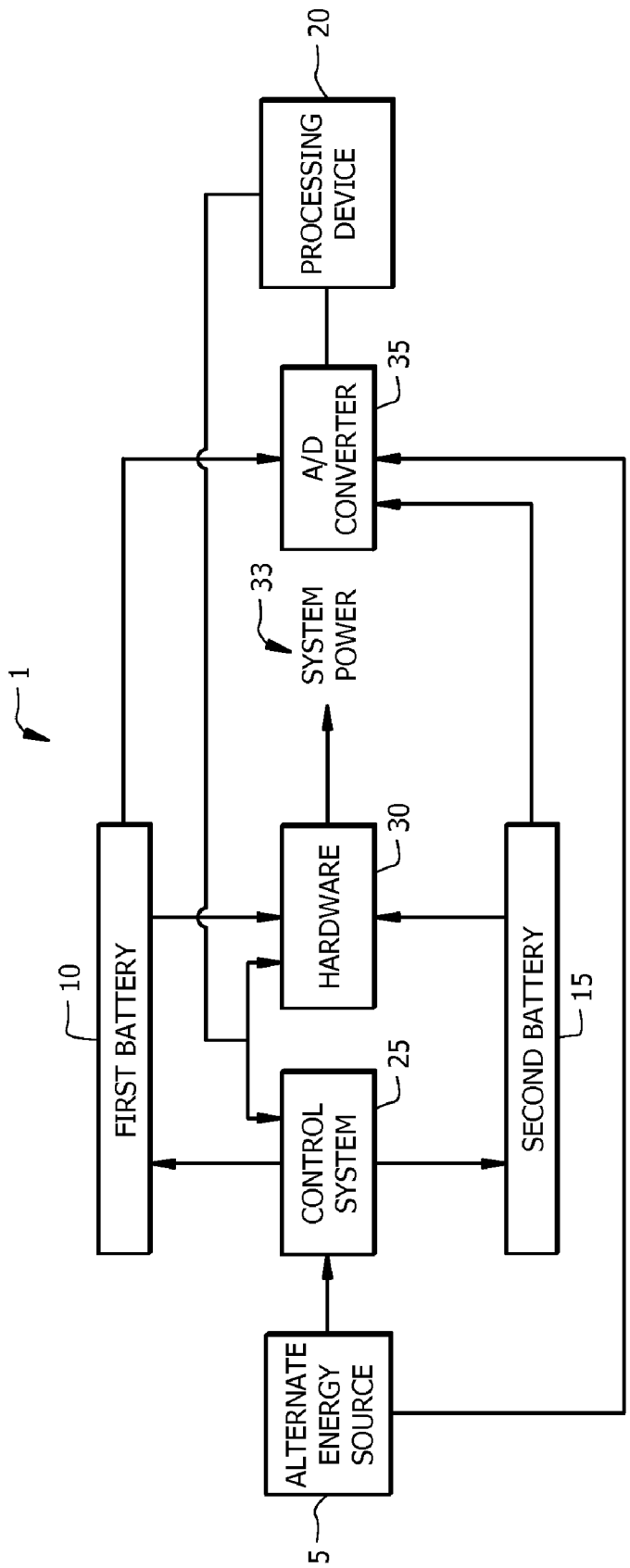
FIG. 1 illustrates a power system hardware block diagram.

FIG. 1 illustrates a hardware block diagram of a power system 1 having an alternate energy source 5, a first battery 10, a second battery 15, and a processing device 20. Alternate energy source 5 can be any suitable source of alternate energy. For instance, solar cells, wind turbines, hydroelectric power, conversion of mechanical stress to electricity by the Piezoelectric effect, and the like can be used as alternate energy source 5. Alternative embodiments include using more than one type of alternate energy for alternate energy source 5. It is to be understood that one skilled in the art would select an alternate energy source that is suitable for the application.

For illustration purposes, power system 1 is shown having two batteries (first and second batteries 10, 15). Power system 1 is not limited to two batteries but can have more than two batteries. Power system 1 can have any type of battery that is chargeable. Chargeable batteries are well known, and examples of suitable types of chargeable batteries include AA NiMH, NiCd, lithium ion, lithium polymer, and the like. It is to be understood that one skilled in the art would select batteries that are suitable for the application. The batteries of power system 1 can be the same or different types of batteries, preferably the same. For instance, first battery 10 and second battery 15 can be the same type of battery or different types of batteries. It is to be understood that the present invention is not limited to batteries but can include any rechargeable power source. Examples of such power sources can include miniature fuel cells and capacitors.

Processing devices are well known in the art, and processing device 20 can be any suitable type of processing device. One skilled in the art can select a suitable processing device for the application. Examples of processing devices include microcontrollers, programmable logic devices, field programmable gate arrays, general purpose processors (GPP), and the like. Preferably, the processing device is a microcontroller. Examples of microcontrollers include a 16-bit MPS430 microcontroller, AT91 ARM Thumb, Z World Rabbit Microprocessor, and the like. In alternative embodiments (not illustrated), power system 1 has more than one processing device.

Hardware for power system 1 can also include control system 25. Control system 25 can include charge circuitry and power control hardware. Charge circuitry and power control hardware are well known in the art, and the control system 25 of the present invention can be any suitable type of such hardware. Preferably, control system 25 can include any type of circuitry sufficient for receiving signals from processing device 20 and for allowing alternate energy source 5 to charge the batteries of power system 1.

Power system 1 can further include hardware 30, which can include hardware such as charge pumps, voltage regulators, and power control hardware. Charge pumps, voltage regulators, and power control hardware are well known in the art, and the hardware 30 of the present invention can be any suitable type of such hardware. Preferably, hardware 30 can be any type of such hardware sufficient for receiving signals from processing device 20 and for providing charge from a battery to system power 33.

Power system 1 can also have at least one analog-to-digital (A/D) converter 35. Analog-to-digital converters are well known in the art, and the A/D converter 35 of the present invention can be any suitable type of A/D converter. Preferably, A/D converters 35 are suitable for converting voltage signals from the batteries and alternate energy source 5. In alternative embodiments (not illustrated), the A/D converter 35 is part of processing device 20. In other alternative embodiments (not illustrated), A/D converter 35 is part of hardware 30.

Figure 2:
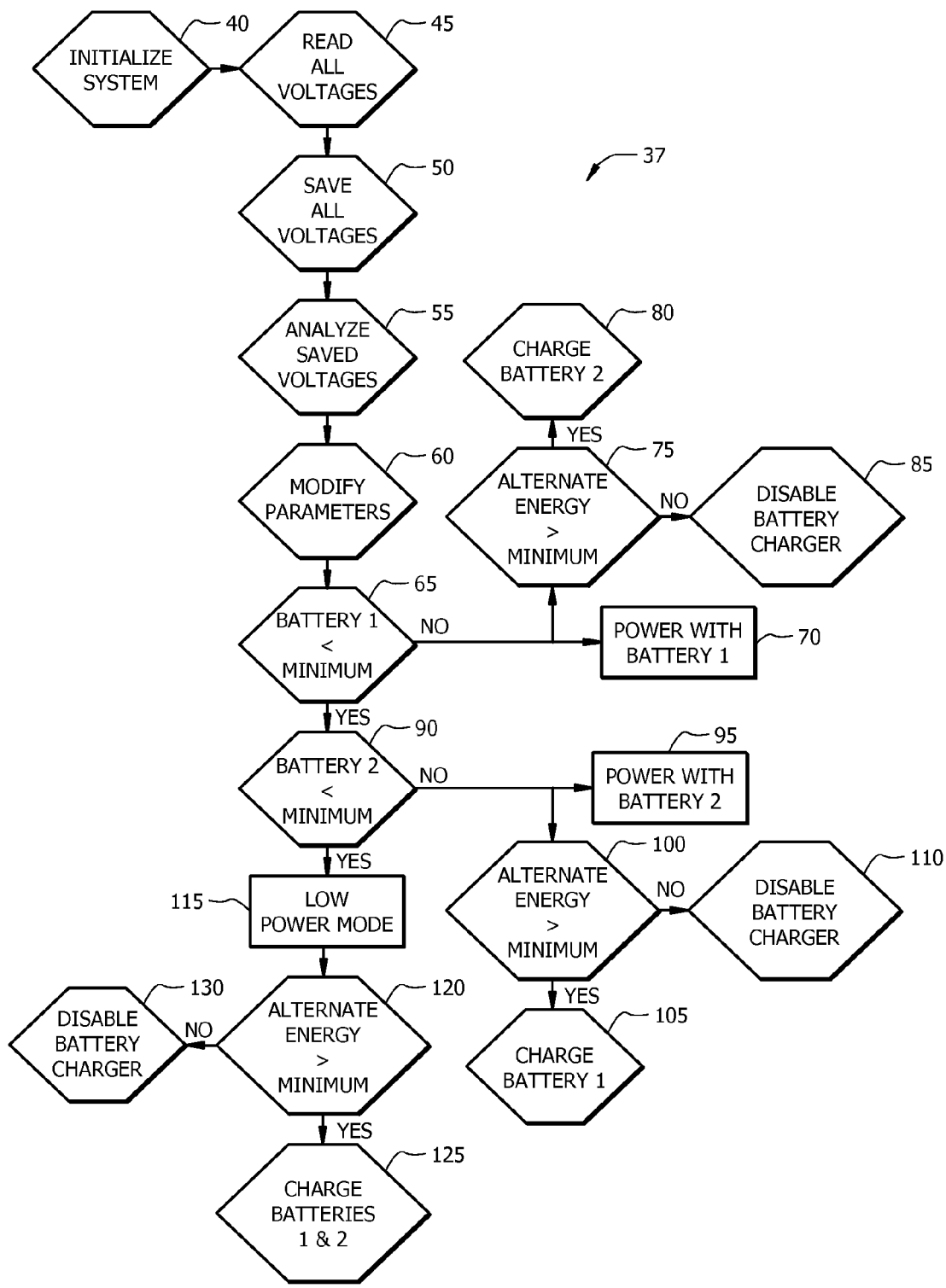
FIG. 2 illustrates a schematic block diagram of an algorithm operating in the system of FIG. 1.

FIG. 2 illustrates a schematic block diagram of an algorithm 37, which can be operated in the system of FIG. 1. Algorithm 37 is programming language independent and can be run on any software. Preferably, the software is programmable for processing device 20. In a first step 40, power system 1 is initialized. When initializing the system, preference can be given to one of the batteries over the other battery or batteries. For illustration purposes and without limitation, preference is given to first battery 10. During initialization, the system also allows first battery 10 to provide power to system power 33 via hardware 30. Also during initialization, processing device 20 can initialize the software methods, variables, memory, and the like.

The voltages of first and second batteries 10, 15 and alternate energy source 5 are read in the next step 45. When such readings are in analog, A/D converters 35 convert the readings to digital for processing device 20. Processing device 20 saves the voltage readings in step 50.

In analyzation step 55, processing device 20 analyzes the voltage readings and also may compare the voltage readings to saved reference voltage data and/or historical reference voltages. The reference voltage data can be input data to use as reference comparisons for the voltage readings, and the historical reference voltages can be saved voltages from past readings. Step 60 involves processing device 20 modifying parameters of power system 1 based upon the results of analyzation step 55. The modifications can be based upon comparisons based on the reference voltages and/or the historical voltages. Parameters can include the length of a variable delay, voltage to be output from power system 1, which battery is providing voltage to be output from power system 1 to system power 33, which battery is being charged, and any parameters associated with the specific alternate energy source used. Modifying voltage output from power system 1 includes modifying the voltage output from alternate energy source 5, first battery 10, and/or second battery 15. It is to be understood that modifying the parameters is not required but is optional based upon analysis by processing device 20. The variable delay is the time length for the next iteration of algorithm 37, and it can be any desired length. Preferably, the variable delay is selected based upon the application, reference voltages and/or historical voltages, the power mode of system power 33, and the like. The variable delay for algorithm 37 can be set with varying lengths depending on the application.

Step 65 is a decision step in which the voltage of first battery 10 is compared by processing device 20 to a minimum threshold voltage for first battery 10. The minimum threshold voltage for first battery 10 can be any desired voltage. Preferably, the minimum threshold voltage for first battery 10 is a voltage that below which is not sufficient for hardware 30 to use first battery 10, below which first battery 10 can cease to be charged and/or below which first battery 10 can be insufficient for system power 33. If the voltage of first battery 10 is not less than its minimum threshold voltage, power is supplied to system power 33 from first battery 10 at step 70. The power can be supplied to system power 33 from first battery 10 via hardware 30. System power 33 can be the power supplied to operate power system 1 or a device and/or application that is powered by power system 1. Step 75 is a decision step in which the voltage of alternate energy source 5 is compared by processing device 20 to a minimum threshold voltage for alternate energy source 5. If the voltage of alternate energy source 5 is greater than its minimum threshold voltage, second battery 15 can be charged in step 80. Step 80 involves processing device 20 indicating to control system 25 to charge second battery 15 from alternate energy source 5. If the voltage of alternate energy source 5 is not greater than its minimum threshold voltage, the battery charger can be disabled in step 85. Step 85 involves processing device 20 indicating to control system 25 to not charge second battery 15 from alternate energy source 5.

If the voltage of first battery 10 is determined to be less than its minimum threshold voltage in step 65, processing device 20 in decision step 90 can compare the voltage of second battery 15 to a minimum threshold voltage for second battery 15. If the voltage of second battery 15 is not less than its minimum threshold voltage, power can be supplied to system power 33 from second battery 15 in step 95. In step 95, processing device 20 indicates to hardware 30 to supply power to system power 33 from second battery 15. Step 100 is a decision step in which the voltage of alternate energy source 5 is compared by processing device 20 to a minimum threshold voltage for alternate energy source 5. If the voltage of alternate energy source 5 is greater than its minimum threshold voltage, first battery 10 can be charged in step 105. Step 105 involves processing device 20 indicating to control system 25 to charge first battery 10 from alternate energy source 5. If the voltage of alternate energy source 5 is not greater than its minimum threshold voltage, the battery charger can be disabled in step 110. Step 110 involves processing device 20 indicating to control system 25 to not charge first battery 10 from alternate energy source 5.

If in step 90 processing device 20 determines that the voltage of second battery 15 is less than its minimum threshold voltage, processing device 20 can switch power system 1 into low power mode in step 115. Low power mode includes not sending voltage to system power 33. In some embodiments, low power mode can include processing device 20 receiving sufficient power to control power system 1. Low power mode may include not sending voltage to parts of system power 33 that are not involved in power system 1. In alternative embodiments, voltage is not supplied to processing device 20. For instance, in such alternative embodiments, processing device 20 may not support the voltage in low power mode. After power system 1 is in low power mode, in step 120 the voltage of alternate energy source 5 can be compared by processing device 20 to its minimum threshold voltage. If the voltage of alternate energy source 5 is not greater than its minimum threshold voltage, the battery charger can be disabled in step 130. Step 130 involves processing device 20 indicating to control system 25 to not charge first battery 10 and second battery 15 from alternate energy source 5. If the voltage of alternate energy source 5 is greater than its minimum threshold voltage, first and second batteries 10 and 15 are charged in step 125. Step 125 involves processing device 20 indicating to control system 25 to charge first battery 10 and second battery 15 from alternate energy source 5.

Algorithm 37 can have any desired number of iterations with the variable delay determining when the next iteration begins. It is to be understood that when a next iteration begins, such next iteration preferably begins at step 45. As described above, power system 1 and algorithm 37 allow voltage to be supplied to system power 33 and at the same time allow for charging of a battery. In addition, the energy collected by alternate energy source 5 can be maximized. After algorithm 37 has been followed for an iteration, the time remaining during the variable delay until the next iteration begins allows such voltage to be supplied and also allows for the charging of a battery. The variable delays can be the same or can have varying lengths.

In alternative embodiments, processing device 20 can stop iteration 37 and not supply any voltage from the batteries to system power 33. For instance, the application for which system power 33 is applied may not need to be active at nighttime. In such an application, processing device 20 can determine from historical data in step 55 that it is nighttime (e.g., historical voltage data for alternate energy source 5 when the source is a solar source). Upon such a determination, processing device 20 can indicate to power system 1 to not supply any voltage to system power 33 and to not run any further iterations for a given variable delay (e.g., a variable delay that will last until dawn). Preferably, processing device 20 can receive sufficient power to control power system 1.

It is to be understood that algorithm 37 is not limited to alternate energy source 5, first battery 10, and second battery 15 but can be extended to be used with embodiments having more than two batteries and/or more than one alternate energy source. In such embodiments, algorithm 37 can be extended to incorporate the additional batteries and/or alternate energy sources. In addition, extra hardware such as additional charge circuitry and power control and/or charge pumps, voltage regulators, and power control can be added to power system 1 as well. For instance, in an embodiment (not illustrated) wherein power system 1 has a third battery, steps 80, 105, and 125 can also include charging the third battery. In such an embodiment, algorithm 37 can also have additional steps between step 90 and step 115, with such steps being similar to steps 65, 70, 75, 80 and 85 or steps 90, 95, 100, 105, and 110, but processed in regards to the third battery. For further instance, in an embodiment (not illustrated) wherein power system 1 has a second alternate energy source, algorithm 37 can have steps 75', 100', and 120'. In such a further instance, if the voltage of the first alternate energy source is determined to not be greater than its minimum threshold voltage, the voltage of the second alternate energy source can be compared to its minimum threshold voltage in steps 75', 100', or 120'. The second alternate energy source can charge a battery or batteries in steps 80, 105, or 125 if it has a voltage greater than its minimum threshold voltage, or if not then the chargers are disabled in steps 85, 110, or 130.

Power system 1 can be used for any desired application or device in which chargeable power sources and/or batteries are used. Examples of applications include cell phones, wireless sensor networks, seismic detection, cure-rate monitoring, contaminant and flow monitoring, tracking and routing of personnel and machinery, seismic monitoring of civil structures, and the like. Algorithm 37 enables power system 1 and any device or application powered by it to have an extended life and uptime. As one power source is supplying power to system power 33, the other power source or sources are being charged by the alternate energy source. A power source selected by algorithm 37 can have reduced problems such as battery memory by its providing power to system power 33 until it is below its minimum threshold voltage.

Figure 3:
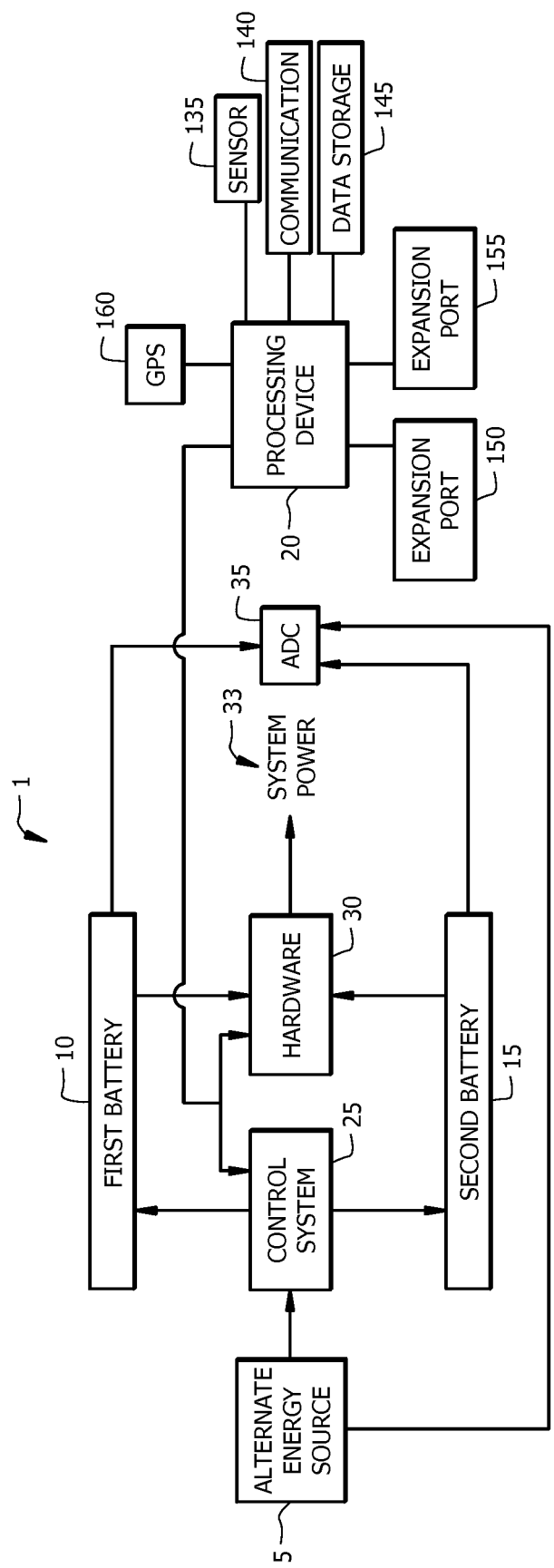
FIG. 3 illustrates a power system hardware block diagram having sensor and communication modules.

Power system 1 is not limited to the hardware as illustrated in FIG. 1 but can have additional hardware as desired for an application. For instance, sensor modules, communication modules, and the like can be included. FIG. 3 illustrates an embodiment of power system 1 having some of such additional hardware. FIG. 3 comprises substantially all of the elements of the above-discussed embodiments as illustrated in FIG. 1 and alternative embodiments thereof, with the additional elements discussed below. As illustrated in FIG. 3, power system 1 has a sensor module 135, a communications module 140, a data storage module 145, expansion ports 150 and 155, and a GPS module 160. For instance, a communications node having the hardware of FIG. 3 can have its longevity extended indefinitely.

It is to be understood that the present invention is not limited to batteries supplying voltage to power system 33. Additional alternative embodiments include alternate energy source 5 also supplying voltage to system power 33.

Although the present invention and its advantages have been described in detail, it should be understood that various changes, substitutions and alterations may be made herein without departing from the spirit and scope of the invention as defined by the appended claims.

What is claimed is:

1. A system for extending a device life, comprising:
   a plurality of power sources, wherein each power source is disposed to be charged when one of the power sources is providing voltage to the device;
   an alternate energy source, wherein the alternate energy source is disposed to charge power sources that are not providing voltage to the device; and
   (i) reads the voltages of the power sources and the alternate energy source,
   (ii) saves the measured voltages of the power sources and the alternate energy source in a saved voltage data history,
   (iii) selects a variable time delay based on the saved voltage data history, and
   (iv) repeats (i)-(iii) after the variable time delay.

2. The system of claim 1, wherein the power sources are batteries.

3. The system of claim 1, wherein the processing device determines which power source provides the voltage to the device.

4. The system of claim 3, wherein the processing device determines whether a power source is to be charged.

5. The system of claim 1, wherein the alternate energy source charges the power sources that are not providing voltage to the device.

6. The system of claim 1, wherein the alternate energy source provides voltage to the device.

7. The system of claim 1, wherein the alternate energy source does not charge the plurality of power sources.

8. The system of claim 1, wherein the processing device comprises a microcontroller, a programmable logic device, a field programmable gate array, or a general purpose processor.

9. A method for extending a device life, comprising:
   (A) providing a plurality of power sources and an alternate energy source;
   (B) measuring the voltages of the power sources and the alternate energy source;
   (C) saving the measured voltages of the power sources and the alternate energy source in a saved voltage data history and selecting a variable time delay based on the saved voltage data history;
   (D) selecting a power source to provide voltage to the device, wherein the selected power source provides voltage to the device;
   (E) charging any power source that is not providing voltage to the device in step (D); and
   (F) repeating steps (B)-(E) after the variable time delay.

10. The method of claim 9, wherein the power sources are batteries.

11. The method of claim 9, wherein step (D) further comprises comparing the voltage of a first power source to a first power source minimum threshold voltage.

12. The method of claim 11, wherein the first power source provides the voltage to the device when the voltage of the first power source is greater than the first power source minimum threshold voltage.

13. The method of claim 12, wherein the voltage of the alternate energy source is compared to an alternate energy minimum threshold voltage.

14. The method of claim 13, wherein the alternate energy source charges the any power source that is not providing voltage to the device when the voltage of the alternate energy source is greater than the alternate energy minimum threshold voltage.

15. The method of claim 13, wherein the alternate energy source does not charge the any power source that is not providing voltage to the device when the voltage of the alternate energy source is not greater than the alternate energy minimum threshold voltage.

16. The method of claim 11, wherein the any power source that is not providing voltage to the device comprises a second power source, wherein the voltage of the second power source is compared to a second power source minimum threshold voltage when the voltage of the first power source is less than the first power source minimum threshold voltage.

17. The method of claim 16, wherein the second power source provides the voltage to the device when the voltage of the second power source is not less than a second power source minimum threshold voltage.

18. The method of claim 17, wherein the voltage of the alternate energy source is compared to an alternate energy minimum threshold voltage.

19. The method of claim 18, wherein the alternate energy source charges the first power source in step (E) when the voltage of the alternate energy source is greater than the alternate energy minimum threshold voltage.

20. The method of claim 18, wherein the first power source is not charged by the alternate energy source when the voltage of the alternate energy source is not greater than the alternate energy minimum threshold voltage.

21. The method of claim 16, wherein a low power mode is selected for the device when no power source has a voltage greater than a minimum threshold voltage.

22. The method of claim 21, wherein the voltage of the alternate energy source is compared to an alternate energy minimum threshold voltage.

23. The method of claim 22, wherein the alternate energy source charges the plurality of power sources in step (B) when the voltage of the alternate energy source is greater than the alternate energy minimum threshold voltage.

24. The method of claim 9, wherein the alternate energy source provides voltage to the device.

25. A method for extending a device life, comprising:
   (A) providing a plurality of power sources and an alternate energy source, wherein the plurality of power sources are capable of being charged, wherein each power source has a respective power source minimum threshold voltage;
   (B) measuring the voltage of the plurality of power sources and the alternate energy source;

- (C) saving the measured voltages of the power sources and the alternate energy source in a saved voltage data history and selecting a variable time delay based on the saved voltage data history;
- (D) comparing the voltage of a first power source to a first power source minimum threshold voltage, wherein the plurality of power sources includes the first power source;
- (E) comparing the voltage of at least one other power source to at least one power source minimum threshold voltage;
- (F) comparing the voltage of the alternate energy source to an alternate energy minimum threshold voltage;
- (G) selecting a low power mode for the device if the voltage of each power source is less than each respective power source minimum threshold voltage; and
- (H) repeating steps (B)-(G) after the variable time delay.

26. The method of claim 25, wherein the power sources are batteries.

27. The method of claim 25, wherein step (D) further comprises the first power source providing voltage to the device when the voltage of the first power source is not less than the first power source minimum threshold voltage.

28. The method of claim 27, wherein the voltage of the alternate energy source is compared to an alternate energy minimum threshold voltage after step (D).

29. The method of claim 25, wherein the alternate energy source charges the at least one other power source when the voltage of the alternate energy source is greater than the alternate energy minimum threshold voltage.

30. The method of claim 28, wherein the at least one other power source is not charged by the alternate energy source when the voltage of the alternate energy source is less than the alternate energy minimum threshold voltage.

31. The method of claim 25, wherein step (B) is accomplished when the voltage of the first power source is less than the first power source minimum threshold voltage.

32. The method of claim 31, wherein at least one of the at least one other power source provides voltage to the device when the voltage of the at least one of the at least one other power source is greater than a power source minimum threshold voltage.

33. The method of claim 32, wherein the voltage of The alternate energy source is compared to an alternate energy minimum threshold voltage.

34. The method of claim 33, wherein the alternate energy source charges the first power source when the voltage of the alternate energy source is greater than the alternate energy minimum threshold voltage.

35. The method of claim 33, wherein the first power source is not charged by the alternate energy source when the voltage of the alternate energy source is less than the alternate energy minimum threshold voltage.

36. The method of claim 25, step (G) further comprises comparing the voltage of the alternate energy source to an alternate energy minimum threshold voltage.

37. The method of claim 25, wherein the voltage of the alternate energy source is compared to an alternate energy minimum threshold voltage when the low power mode of step (G) is selected.

38. The method of claim 37, wherein the alternate energy source charges the plurality of power sources when the voltage of the alternate energy source is greater than the alternate energy minimum threshold voltage.

39. The method of claim 25, wherein the alternate energy source provides voltage to the device.

* * * * *